United States Patent [19]

Klüge

[11] 4,030,078

[45] June 14, 1977

[54] DYNAMIC MEMORY ARRANGEMENT FOR PROVIDING NONCYCLIC DATA PERMUTATIONS

[75] Inventor: Werner Klüge, Bensberg-Refrath, Germany

[73] Assignee: Gesellschaft fur Mathematik und Datenverarbeitung m.b.H., Bonn, Germany

[22] Filed: Dec. 16, 1975

[21] Appl. No.: 641,593

[30] Foreign Application Priority Data

Dec. 16, 1974 Germany ............ 2459476

[52] U.S. Cl. ............ 340/172.5
[51] Int. Cl.² ............ G11C 9/02; G11C 19/00; G11C 21/00
[58] Field of Search ............ 340/172.5; 444/1

[56] References Cited

UNITED STATES PATENTS

| | | | |
|---|---|---|---|
| 3,226,683 | 12/1965 | Gaffney, Jr. | 340/172.5 |
| 3,388,381 | 6/1968 | Prywes et al. | 340/172.5 |
| 3,548,384 | 12/1970 | Barton et al. | 340/172.5 |
| 3,614,746 | 10/1971 | Klinkhamer | 340/172.5 |
| 3,716,840 | 2/1973 | Masten et al. | 340/172.5 |
| 3,737,864 | 6/1973 | Werner | 340/172.5 |
| 3,766,534 | 10/1973 | Beausoleil et al. | 340/172.5 |
| 3,916,387 | 10/1975 | Woodrum | 340/172.5 |

OTHER PUBLICATIONS

Stone; "Dynamic Memories with Enhanced Data Access" in IEEE Transactions on Computers, vol. C-21, No. 4, Apr., 1972; pp. 359-366.
Aho & Ullman; "Dynamic Memories with Rapid Random and Sequential Access" in IEEE Transactions on Computers, vol. C-23, No. 3, Mar. 1974; pp. 272-276.

Primary Examiner—Melvin B. Chapnick
Attorney, Agent, or Firm—Spencer & Kaye

[57] ABSTRACT

Circuit arrangement for noncyclic data permutations between the memory cells of a dynamic memory including a permutation network for transferring the contents of a predetermined memory cell into the access port or read-write cell of the memory and an access control system for producing a permutation sequence. The permutation network is comprised of $2^k-1$ memory cells which are arranged in a tree-like structure in $k$ of 0 to $k-1$ numbered planes so that plane $i$ is formed of $2^i$ memory cells. Each memory cell of plane $i$ is connected to two adjacent interconnected memory cells of plane $i+1$ so that these three memory cells form a triangle in which the contents of these cells can be cyclically interchanged in a clockwise direction. Each memory cell of the planes $1 \leq i \leq k-2$ belongs to two triangles while the one memory cell of plane 0, which acts as the access port or read-write cell, and the memory cells of plane k-1 belong to but one triangle. The access control system provides for the simultaneous transfer of the contents of the memory cells disposed in even numbered planes to the associated memory cells of the next higher odd numbered planes (permutation A) or for the simultaneous transfer of the contents of the memory cells disposed in odd numbered planes to the associated memory cells of the next higher even numbered plane (permutation B) to effect either permutation A or permutation B.

8 Claims, 10 Drawing Figures

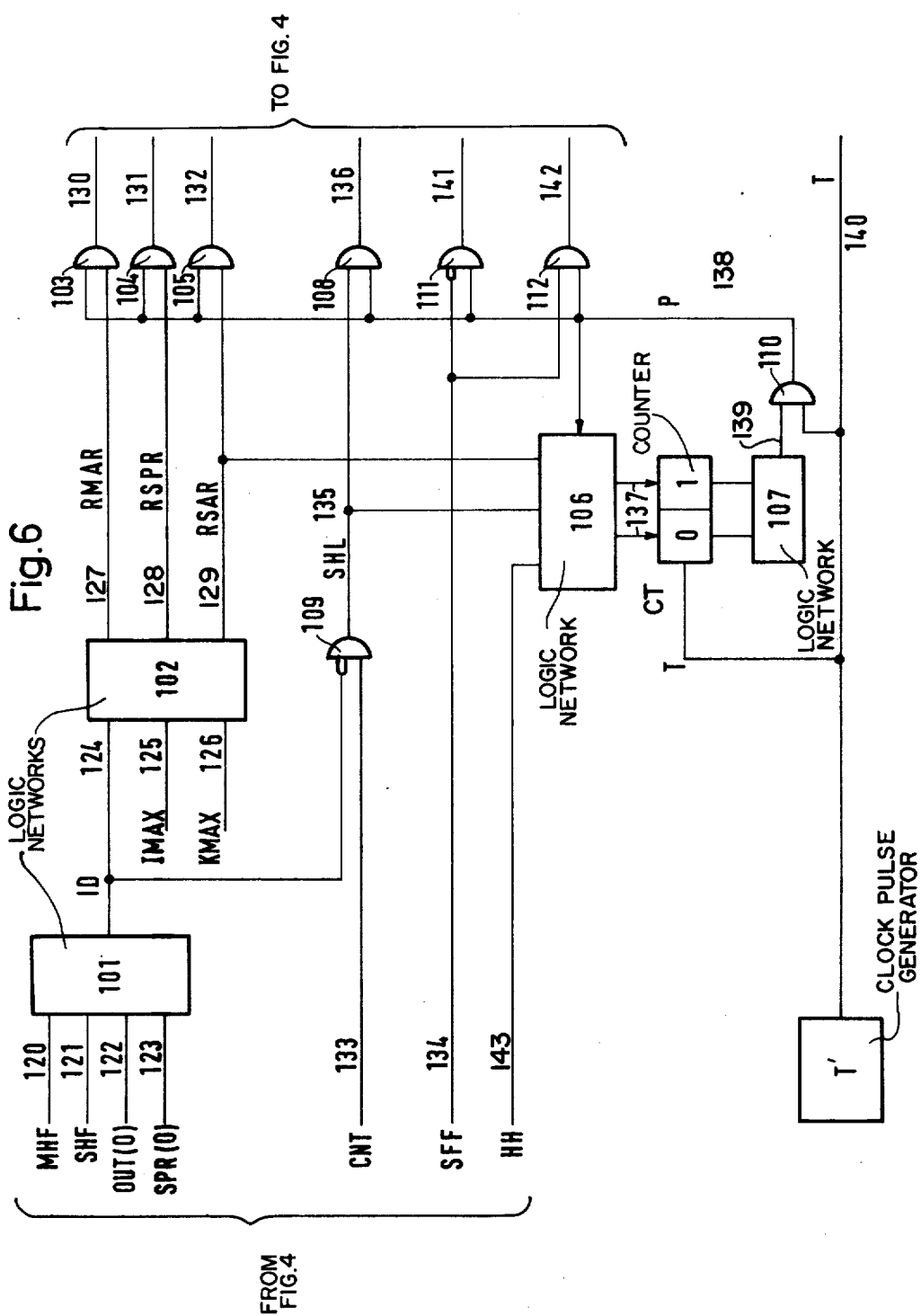

DYNAMIC MEMORY ARRANGEMENT FOR PROVIDING NONCYCLIC DATA PERMUTATIONS

BACKGROUND OF THE INVENTION

The present invention relates to a circuit arrangement for noncyclic data permutations between the memory cells of a dyanmic memory having a permutation network for transferring the contents of a predetermined memory cell to the read-write cell of the memory and an access control system for producing a permutation sequence.

In computer systems, disc and drum memories are used predominantly to store large quantities of data. In these memories the data are recorded on a magnetic medium which performs a continuous rotating movement at constant speed with respect to a fixed write-read or input-output head. A drawback of this cyclic data movement relative to the reading head is that the access time for any desired datum depends on its position with respect to the reading head at the moment it is being addressed so that as a statistical average one-half revolution of the record carrier is required before the desired datum can be read out or written in. The time required for this lies in the range of milliseconds so that direct access by the central processing unit, which operates by about three to four orders of magnitude faster, is economically unjustified. Therefore, these dynamic memories are used as background memories from which contiguous data blocks are initially transferred via indpendently operating channel systems to the main memory before access is possible by the central processor. In this way, the central processing unit can bridge the access time gap resulting from calling a data block from the background memory with other activity. This process, however, is connected with substantial administrative efforts, for example, for releasing a memory region, providing a channel program and treating interrupts. Furthermore, the transfer of a contiguous data block is often not necessary at all if, for example, only individual data need to be inspected. For these reasons it is advisable to provide the central processing unit with rapid direct access to individual data as well as to contiguous data blocks which are stored in background memories of very large capacity.

Background memories can be realized only through techniques which are distinguished by low costs per bit and an extremely high data packing density. In this respect, charge transfer devices seem to be particularly well suited instead of drum memories and magnetic domain devices instead of disc memories. These techniques, in contradistinction to disc and drum memories, require continuous movement of data relative to the memory medium itself as well as relative to the write-read head which is attached to the memory medium. Due to the movement relative to the memory medium it becomes possible to implement switching functions so that data movement need not be limited to cyclic movement. Rather the contents of a memory cell can be selectively transferred to one of two or more successor cells while the cell itself at the same time takes over the contents of one of two or more precursor cells. In this way several paths or more exactly one very short path is available on which the contents of an arbitrarily selected cell can be transported to the read-write cell.

A permutation shuffle or transformation network is known (IEEE Transactions on Computers, Volume C-2, No. 4(1972), p. 359-366) which is based on a tree-like connecting structure in which every memory cell has exactly two successor cells and two precursor cells. All connections within the network are associated to two permutations of which the connections of one permutation are activated simultaneously. The two permutations are arranged so that in a memory having $2^k$ cells the contents of each cell can be brought to the read-write cell, i.e., the access port or input-output port cell, of the memory in at most $k$ steps.

In another known permutation network (IEEE Transactions on Computers Vol. C-23, No. 3 (1974) pages 272-276) the connections between the cells are arranged so that with a total capacity of $2^k-1$ cells and likewise two permutations, the contents of a cell can be transported to the read-write cell in the order of magnitude of $k$ steps; however the contents of all sequentially following cells can be transported to the read-write cell in one further step each.

A decisive drawback of both networks is that connections must be established between non-adjacent memory cells and with the appropriate memory capacities such connections require a complex, nonplanar connecting network with a substantial number of line crossovers which calls for a considerable proportion of the area available on the memory chip. These networks are entirely unsuitable for magnetic domain devices since here it is not possible to transport data over greater distances in one permutation clock time.

SUMMARY OF THE INVENTION

It is therefore the object of the present invention to structure the permutation network so that an exchange of data takes place only between directly adjacent memory cells, that the connecting network remains free of crossovers and that access to one memory cell is possible in the order of magnitude of $k$ clock pulses, access of $2^g$ successive cells can take place in the order of magnitude of $2^g$ clock pulses with a total memory capacity of $2^k-1$ ($k \geq g$) cells.

This is accomplished according to the invention in that the permutation network is constituted by $2^k-1$ memory cells in the form of a tree structure arranged in $k$ planes enumerated 0 to $k-1$ so that the plane $i$ is formed of $2^i$ memory cells with each memory cell of plane $i$ being connected with two adjacent interconnected memory cells of plane $i+1$ so that these three memory cells form a triangle in which the contents of these memory cells can be cyclically interchanged in a clockwise direction, and with each of the memory cells of planes $1 \leq i \leq k-2$ being associated with two triangles while the one memory cell of plane 0, which serves as the access port or read-write cell of the memory, and every one of the memory cells of plane $k-1$ is associated with only one triangle; and in that an access control system is provided for effecting either a permutation A or a permutation B in the permutation network with permutation A constituting the simultaneous transfer of the contents of the memory cells arranged in even numbered planes to associated memory cells of the next-higher odd numbered planes and permutation B constituting the simultaneous transfer of the contents of the memory cells of the odd numbered planes into associated memory cells of the next-higher even numbered plane. Preferably, the access control system substantially comprises a permutation status register SAR for identifying the actual permutation state of the permutation network with the aid of the binary code of the address whose contents are present at the read-write cell, a memory address register MAR for receiving the binary code of the address of the memory cell whose contents are to be written in or read out next, and a logic comparison network connected in series with registers MAR and SAR to produce the shortest permutation sequence for transferring the cell contents from a predetermined memory cell into the read-write cell.

It is here advisable for each memory cell to be provided with a first and a second data input for receiving a datum and a first and a second data output for releasing a datum stored in the memory cell, with a control input for feeding in a binary 1 signal and thus opening the first data input and the first data output, or for feeding in a binary 0 signal and thus opening the second data input and the second data output, and with a device for receiving synchronization pulses which effect the data transfer; and that for memory cells of planes 0 and $k-1$, the first data output be connected with the first data input or the second data output with the second data input of the same memory cell.

In an advantageous embodiment of the circuit arrangement of the present invention the permutation network is formed of a memory capcaity of $2(2^k-1)$ cells which are uniformly distributed over two tree-like memory networks so that the first network contains all cell addresses in whose binary code the bit of value 2 carries a 0 and the second network contains all cell addresses whose binary code has a 1 at this location and that a selector circuit operated by the access control system automatically produces the connection with one of the two read-write cells of the two memory networks.

The access control system according to this embodiment of the invention then substantially comprises: a memory address register MAR which is designed as a forward-backward shift register and is provided with $k$ binary locations for shifting the address code which consists of $k+1$ bits, except for the bit of value 2, into a one-position overflow register HM which is connected together with the memory address register to form a ring shift register; a one-position register MFF for receiving the bits of value 2 of the address, a permutation status register SAR, in the form of a forward-backward shift register with $k$ binary positions, which in every permutation state contains the binary code of the address of the memory cell - except for the bit of value 2 - whose contents are presently in the read-write cell of the first network; a one-position overflow register HS which, when the permutation status register SAR shifts to the right, takes over its bit of position 0, the contents present in overflow register HS before the transfer being erased, and when the permutation status register SAR shifts to the left, transfers its contents to the bit of position 0 in the permutation status register SAR and takes over the contents of the overflow register HM: a forward-backward shift register SPR with $k$ binary locations which contains a pointer of the type that only one binary location has the value 1 and all other binary locations have the value 0; a one-position register SFF to identify the last permutation A performed with a 1 or the last permutation B with a 0; a one-position register MHF for identifying the first permutation A with a 1 or the first permutation B with a 0 in the permutation sequence required for access to the address contained in the memory access register MAR; a one-position register SHF to indicate the first permutation A with a 1 or the first permutation B with a 0 of the permutation sequence required for the contents of permutation status register SAR; a one-position control register HH for duplicating the contents of overflow register HS; an $m$-position counter register CNT for counting the shifts to the right effected by memory address register MAR by counting upwards and the shifts to the left by counting downwards; a shift register DEL with three binary positions whose contents are shifted to the right with every permutation, in whose left binary position a permutation A is marked with a 1 and a permutation B with a 0, and from whose right-hand binary position the control signal for the permutation in the second permutation network can be obtained after two permutation clock times; a shift register READ whose contents are shifted to the right with every permutation and whose left-hand binary location is set to 1 when the register MFF carries a 1, the contents of memory address register MAR and permutation status register SAR coincide so that when a 1 appears in the right-hand binary position of the READ shift register, the reading head of the second network is addressed; a logic network COMP for evaluating the contents of memory address register MAR, permutation status register SAR and indicator register SPR and for producing control signals; and an internal guide system for performing the microprograms required for controlling the registers and the permutations.

The advantages realized with the permutation network for dynamic memories as provided by the present invention are that compared to memories with the same capacity of $2^k$ or $2^k-1$ cells, respectively, with cyclic data permutation the access time to any desired datum is drastically shorten from an average of $2^k-1$ permutation clock times to a maximum of $3k$ permutation clock times, that the transfer of a memory page with $2^g$ successive cell contents takes exactly $m+3(2^{g-1}-1)$ permutation clock times, $m>2$ $(k-g)$, and that compared to the known permutation networks with which access times of the same order of magnitude can be realized, the network of the present invention is technically much easier to realize due to its planar, no crossover structure in which connections are required only between directly adjacent cells.

BRIEF DESCRIPTION OF THE DRAWINGS

FIG. 6 is a block diagram of a logic network that controls the register shifts within the access control system and the generation of the permutation signals.

DETAILED DESCRIPTION OF THE PREFERRED EMBODIMENTS

In the case of a cyclically permutating memory, i.e., a dynamic shift register memory, $2^k$ memory cells which are numbered 0 to $2^k-1$ are connected together so that the output of cell 1 is brought to the input of cell $i+1$ and the output of cell $2^k-1$ is brought to the input of cell 0 which serves as the read-write cell. During the performance of a permutation all cells simultaneously transfer their contents to the next following cell in the connection structure. In order to transfer the contents of cell $i$ into the read-write cell, $2^k-i$ cyclic permutations are thus required. Consequently, the average access time to a cell corresponds to $2^k1$ permutations, i.e., one half revolution of the closed shift register, thus the average access time is directly proportional to the memory capacity.

This average access time can be shortened in principle in that the cyclic connection structure is replaced by a much more complex network, in which some or all of the cells can be selectively connected by external control signals with one of a plurality of precursor cells whose contents are being transferred as well as with one of a plurality of successor cells to whom the present contents are simultaneously transferred. This makes it possible to connect much shorter paths between a predetermined cell and the read-write cell than with a purely cyclic permutation and thus to correspondingly reduce the number of permutations to be performed. For reasons of information retrieval, each cell which accepts the contents of a first other cell must simultaneously transfer its contents to a second other cell and vice versa. This inevitably leads to the conclusion that each cell must be member of a cycle during each data permutation but that, in contradistinction to the abovementioned one cyclic permutation to which all cells belong simultaneously, one cell may alternatively belong to a plurality of small permutation cycles whose number is determined by the larger number of input or output connections, respectively, of the cell, of which, however, no more than one permutation must be performed per cell.

Figure 1:
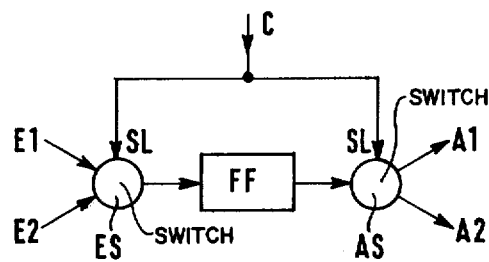
FIG. 1 is a schematic representation of a memory cell for the system according to the invention.

In view of a technical realization with justifiable expenditures, memory cells with no more than two inputs and two outputs must be considered appropriate. Such a memory cell is schematically illustrated in FIG. 1 and constitutes the basic memory cell in the system according to the invention. The actual data storage takes place in the unit FF which may, for example, be a flip-flop. The input switch ES and the output switch AS are simultaneously switched via a control line SL by means of a binary control signal C so that in the deactivated case (i.e. C=0) the unit FF takes over the contents of the memory cell connected ahead of input E1 and transfers its present contents to the memory cell connected behind output A1, while in the case of an activated switch $E_s$ and $A_s$ (i.e. C=1) the information to be stored is received from input E2 and the previously stored information is discharged via output A2.

Figure 10:
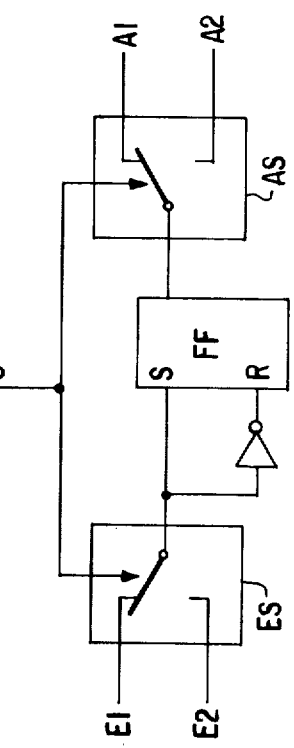
FIG. 10 is a more detailed schematic diagram of the basic memory cell of FIG. 1.

A more detailed schematic circuit diagram of the basic memory cell of FIG. 1 is shown in FIG. 10 from which it can be seen that each of the switches AS and ES functionally can be realized by simple two-way switch of the type commonly found in a relay with the position of the switch being controlled by the signal C. It is to be understood however that in a practical embodiment the switches ES and AS will be realized by simple logic circuit arrangements.

Figure 2:
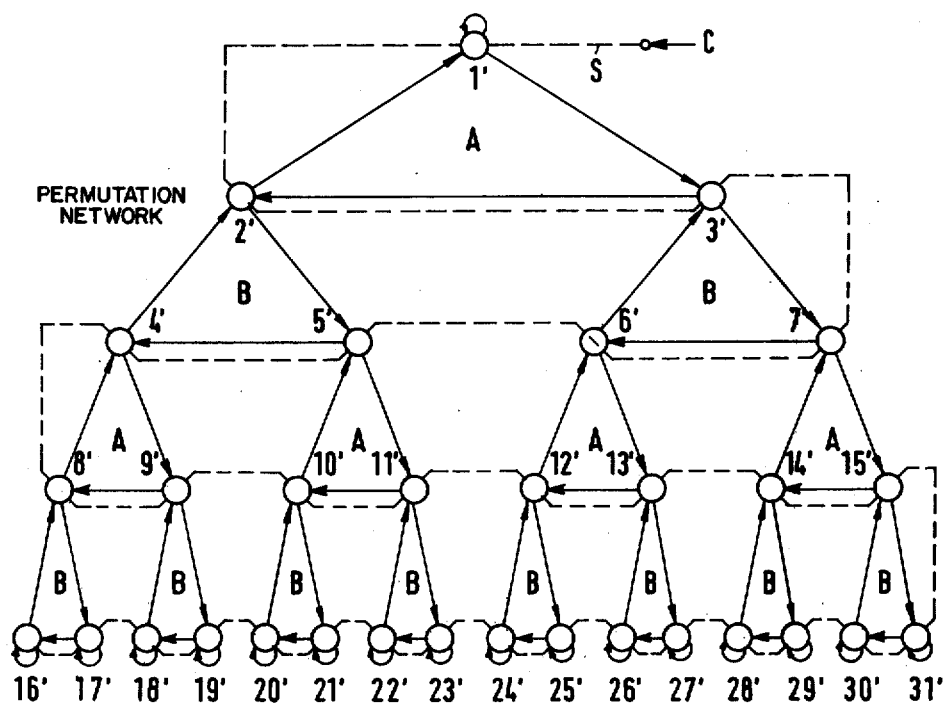
FIG. 2 shows the structure of a memory or permutation network according to the invention.

Such a memory cell forms the basic module of a tree-like branching memory or permutation network whose structure is shown schematically in FIG. 2. The memory cells are arranged in consecutively numbered planes, plane 0 containing a memory cell 1' which is used as the read-write cell and each plane containing $2^i$ memory cells. The connecting structure between the cells is arranged so that each cell of a plane $i$ in region $1 = i < k-2$, where $k-1$ is the index of the highest plane of the tree, has a neighboring cell at its input and at its output in plane $i+1$. Corresponding to the cell numbering shown in FIG. 2 every even numbered cell in plane $i$ also has a neighboring cell at its input in plane $i$ as well as a neighboring cell at its output in plane $i-1$, and every odd numbered cell in plane $i$ has a neighboring cell at its output in plane $i$ and a neighboring cell at its input in plane $i-1$. The inputs and outputs of the memory cells are connected so that every cell of a plane $i$ in the region $1 < i < k-2$ can be connected either with the two neighboring cells in plane $i+1$ or with the neighboring cells in planes $i$ or $i-1$, respectively, to form a permutation cycle in a clockwise direction which cycle includes a total of three cells. Since the read-write cell 1' has no neighboring cells in a nextlower plane and the cells 16'-31' of plane $k-1$ have no neighboring cells in a next higher plane, these cells participate in only one permutation cycle, i.e., when the respective other permutation cycle is being performed the contents of these cells remain in place. In order to keep the number of possible permutation states in the memory network and the resulting complexity of the access control system low, the groups-of-three permutations which exchange all cell contents in even numbered planes with the contents of the associated cells in the next higher odd numbered planes are effected simultaneously as a first permutation A and the groups-of-three permutations which exchange all cell contents in the odd numbered planes with the contents of the associated cells in the next-higher even numbered planes are effected simultaneously as a second permutation B. With the aprropriate orientation of the inputs and outputs of the memory cells it is possible to manipulate these permutations by means of a single control line S which is connected with the control inputs of all cells - shown in FIG. 2 by a dashed line - so that with a deactivated control line S (C=0) permutation B is performed and with an activated control line S (C=1) permutation A is performed throughout the entire network.

An important characteristic of this permutation network which is of decisive significance for its control is that, starting with an actual permutation state P which has been brought about by any desired sequence of permutations A and B, three performances of one and the same permutation i.e., a sequence PAAA or PBBB will re-establish the original permutation state P. This characteristic which is derived directly from the triple cycle network design can be used in a simple manner to return any desired permutation state to the starting state $\phi$ in which each cell again contains its originally assigned contents.

If the memory network shown in FIG. 2 is in the starting position $\phi$ and if, for example, the contents of memory cell 22' are to be transferred to the read-write cell, it is necessary to first perform permutation B once to shift the data of cell 22' to cell 11' then permutation A twice to shift the data from cell 11' to cell 10' and then to cell 5' and then permutation B twice to shift the data from cell 5' to cell 2' via cell 4', and finally permutation A once to shift the data from cell 2' to the read-write cell 1', i.e., a total sequence BAABBA. As shown in FIG. 2, the transfer of the contents of the read-write cell 1' to cell 22' on the other hand requires the complementary permutation sequence AABABB. A concatenation of the permutation sequence leading from cell 22' to cell 1' and of the permutation sequence leading from cell 1' to cell 22' results in

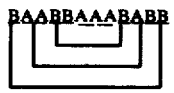

The consequent use of the rule that three consecutive identical permutations compensate one another and can therefore be cancelled out of the permutation sequence (which is indicated by the connection symbols) shows that the above-given sequence leads back to the starting state $\phi$ of the network. The direct consequence of this is the permutation strategy required after access to a certain cell contents, to reconstitute the starting state: the permutation sequence required for transport toward the reading head is reduced in steps in that, beginning with the last performed permutation, all permutations employed are complemented in reverse order with the three consecutive permutations of the same type. This also results in the fact that access to one cell contents in plane $i$ and reconstitution immediately thereafter of the starting state requires exactly $3i$ permutations, i.e., in the worst case with $k$ planes exactly $3(k-1)$ permutations.

In many cases it is not necessary, however, to reconstitute the original permutation state if, for example, two consecutive accesses are made to cells, the first requiring a permutation sequence $PQ_1$ and the second a permutation sequence $PQ_2$, wherein $Q_1$ and $Q_2$ are different and each constitutes, as does P, an arbitrary sequence of permutations A and B. In such a case, after access to the first memory cell, the permutation state need only be reduced to P by complementing the partial sequence $Q_1$ and then be supplemented with $Q_2$.

If, for example, access is first to be made to the contents of cell 22' and then to the contents of cell 26', the sequence BAABBA is performed first. Since access to cell 26', requires the sequence BAABAA and this sequence coincides with that for cell 22' with respect to the first four permutations BAAB, the permutation as whole is as follows:

(the compensating permutations are underlined). Thus the sequence is shortened to a total of twelve permutations compared to twenty-four permutations for reconstitution of the starting state after access to cell 22'.

The successive access to two cells with such a shortened sequence is possible only if at least the first permutation of both sequences is the same, i.e., if both cells lie either on planes with an even numbered or with an odd numbered index. In the case of unequality of the first permutation, the starting state must be reconstituted after access to the first cell before access to the second cell is possible. Since only permutation A changes the contents of the reading head, this is always the last permutation of an access sequence. Permutation sequences for access to cells on the same plane are distinguished by the fact that they begin with the same permutation and have the same number of changes between permutations A and B, since at each change between permutations A and B or between permutations B and A, respectively, the desired cell contents move into a plane with a lower index, i.e., come closer to the read-write cell.

To bridge a plane, at least one but no more than two permutations of the same type must be performed. The shortest access sequence to a cell of a given plane is thus characterized in that permutations A and B are alternatingly performed exactly once, while the longest access sequence to a cell in the same plane is characterized by the fact that permutation A and permutation B are alternatingly performed exactly twice in succession. In FIG. 2, for example, access is made with the shortest sequence for plane 4, i.e., BABA, to cell 16' while the contents of cell 31' are transported to the read-write cell 1' with the longest sequence, i.e., BBAABBAA.

In order to simplify the access control system the permutation memory is operated so that the presently effective permutation state results from a permutation sequence which contains, after cancellation of all subsequences AAA or BBB, no more changes between permutations A and B as are required for access to cells in the highest plane of the network. This means that for the network of FIG. 2 which has only five planes, a sequence BBABAA which accesses cell 25' is permitted but a sequence BBABAABA which accesses cell 9' is not permitted since access to cell 9' can be made with the significantly shorter sequence AABA.

If under this limitation to all $2^i$ cells of a plane $i$ access is to be made with the shortest possible permutation sequence a strategy must be employed with which the entire three disposed between the read-write cell 1' and plane $i$ is traversed in such a way that the total number of permutations to be performed corresponds exactly to the number of connecting edges in this tree. This strategy is explained with the aid of FIG. 2 for access to all memory cells in plane 3 i.e., the plane containing cells 8'–15'. The shortest sequence with which, for example, memory cell 8' of this plane can be reached in ABA. Starting with this sequence, the memory cell 12' of this plane can be reached directly by performing one further permutation A, i.e., by the sequence ABAA. The continuation of this sequence with permutation A and then with permutation B leads to a sequence ending in B, i.e., in none of the two cases will the contents of a further memory cell of plane 3 appear in the read-write cell 1'. In the first case, however, the sequence is effectively shortened to AB, whereafter, by one-time use of the permutation BA, the sequence ABBA results which again feeds a memory cell content to plane 3. The next following memory cell 14' can then again be accessed directly by a further permutation A which extends the sequence to ABBAA. After a third permutation A has shortened the sequence to ABB again, the permutation BABA will bring a further memory cell content of plane 3 which had not previously been accessed to the read-write cell 1'. The consequent continuation of this scheme results generally, for access to the memory cells of a plane $i$, in the fact that initially the shortest possible permutation sequence is used, that the first permutation A which brings a memory cell content of plane $i$ to the read-write cell is supplemented to three permutations AAA and that then the double sequence BA is used repeatedly until a cell content of plane $i$ again appears in the read-write cell $1'$. Then the scheme is continued as above until the entire permutation sequence has again been returned to the starting state $\phi$. The complete permutation sequence for access to all cell contents in plane 3 in the tree structure oF FIG. 2, is listed in the following table which simultaneously lists the addresses of the cells whose contents are in the read-write cell $1'$ after performance of the corresponding permutation sequences.

| Sequence | Address | Sequence | Address |
|----------|---------|----------|---------|
| A        | 2' +    | AA       | 3' +    |
| AB       | 2' +    | AAB      | 3' +    |
| ABA      | 8'      | AABA     | 9'      |
| ABAA     | 12'     | AABAA    | 13'     |
| ABAAA    | 2' +    | AABAAA   | 3' +    |
| ABB      | 2' +    | AABB     | 3' +    |
| ABBA     | 10'     | AABBA    | 11'     |
| ABBAA    | 14'     | AABBAA   | 15'     |
| ABBAAA   | 2' +    | AABBAAA  | 3' +    |
| ABBB     | 2' +    | AABBB    | 3' +    |
|          |         | AAA      | 1' +    |

The symbol + indicates all those sequences which either do not change the contents of the read-write cell $1'$ or at which the contents of the read-write cell $1'$ do not correspond to one of the memory cells of plane 3.

The table shows that with this permutation sequence no more than two cell contents of the desired plane are brought to the read-write cell $1'$ by immediately successive permutations and that these two permutations are followed by at least two further permutations in which the contents of the read-write cell $1'$ do not coincide with that from one of the cells of plane 3. As shown in FIG. 2, this applies for all planes. The total number of permutations performed for plane 3 is 21; this exactly corresponds to the number of edges or paths of the network in the area between the read-write cell $1'$ and plane 3 through which the original contents of the read-write cell $1'$ pass exactly once in the given permutation sequence in the clockwise direction. Consequently, it generally applies that the shortest possible permutation sequence for access to all $2^i$ cells in plane $i$ requires exactly $3(2^i-1)$ permutations.

The permutation properties of the memory structure shown in FIG. 2 can be used with particular advantage in a so-called "paging" system in which the virtual memory space is realized by a dynamic memory. During "paging", data blocks which correspond to the contents of $2^g$ consecutively addressed memory cells of which the first one must have an address $n \cdot 2^g$ are transported between the (virtual) dynamic memory and the (real) main memory of the system. Such a data block, also called a "page", may be stored in the $2^g$ cells of plane $g$ of the given memory structure. Since every cell of plane $g$ is itself the root of a subtree extending to a depth of $k-14$ $g$ planes at a capacity of $2^{k-g}-1$ cells, a total of $2^{k-g}-1$ complete pages can be stored in the memory so that data belonging to the same page are always disposed in the same cells of these subtrees when the memory is at the starting state $\phi$. Between planes 0 and $g-1$ there is an incomplete page of $2^g-1$ cells. Each complete page can thus be permutated to plane $g$ by means of a so-called prefix sequence which in the conventional sense corresponds to the page address in the virtual memory and can be read out or written in from there according to the given minimal algorithm. Since this access sequence usually takes place according to consecutive cell addresses it is advisable to change the cell addresses appropriately from the numbering given in FIG. 2.

The property of a permutation sequence required for access to a page of the length $2^g$ and positioned in plane $g$, that two successive permutations which transport a cell content of this page into the reading head be followed immediately by at least two permutations which provide data not required by the reading head is utilized to double the total available memory capacity without significant expansion of the access control system as well as double the data access rate during "paging". This is done in that two permutation networks of the same capacity are operated simultaneously so that the permutation sequence fed to the first network is also used in the second network with a delay of exactly two permutation clock times. The performance of the permutation sequence required for sequential access to the cells of plane $g$ then brings the result that, during the gap of at least two permutation clock times in read-write cell of the second network produced directly after access to two cell contents in plane $g$ of the first network, exactly two cell contents of plane $g$ of the second network will appear. With the appropriate numbering of the cells in both networks it is thus possible to access exactly eitht consecutivley numbered cells in immediate succession before an access gap occurs. This doubles the access rate, i.e., compared to a single network, exactly $3(2^{g-1}-1)$ permutation periods are required for access to the $2^g$ cells of a page of which one half if now disposed in plane $g-1$ of each of the simultaneously operated permutation memory networks.

Figure 3:
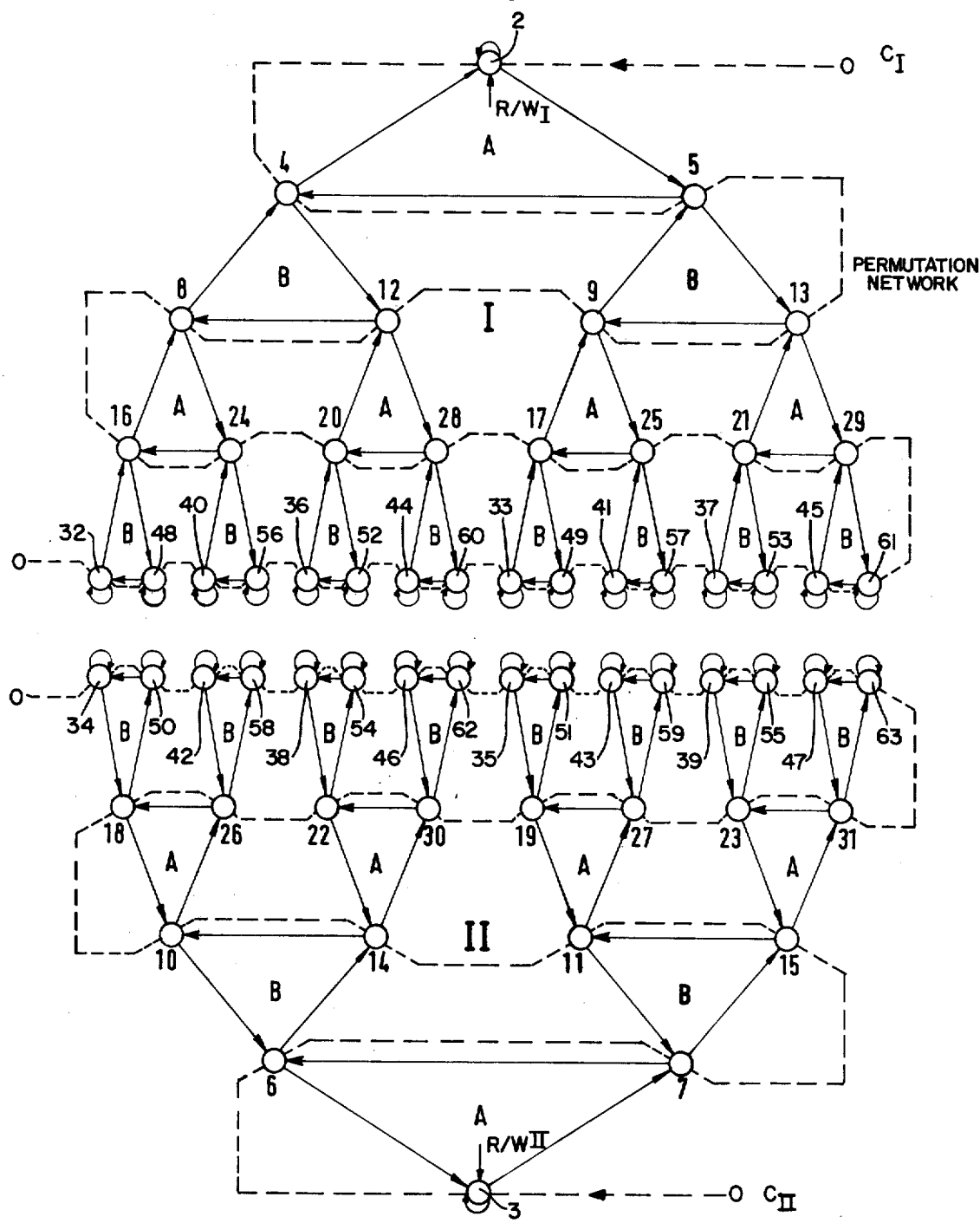
FIG. 3 shows a permutation network comprising two simultaneously operated memory networks of the type shown in FIG. 2.

FIG. 3 is a schematic illustration of such a permutation network in a tandem tree structure whose cells are consecutively numbered so that when the shortest permutation sequence for a plane $i$ is used the cell contents appear in the respective read-write cells 2 and 3 alternatingly in the sequence of monotonously increasing addresses. The law of development for such numbering is given in that in network I, beginning with plane $i=1$, each cell is one plane $i$ with an address $x_i$ is associated with two cells in plane $i+1$ with the respective addresses $x_i+2^{i+1}$ and the address $x_i+2^{i+2}$. For example, cell 4 of plane 1, i.e., $i=1$, is associated with cells in plane 2 with the respective addresses 8 and 12.

In network II cell addresses are always higher by 2 than the addresses of corresponding cells in network I. This brings the direct result that, aside from the address of the respective read-write cells 2 or 3, the binary codes of the addresses in network I have a zero in their 2-value bit while in network II all addresses have a 1 in their 2-value bit. This association of the cell addresses and the permutation sequences required for access to the respective cells determines the structure and function of the access system required to operate the memory.

Figure 4:
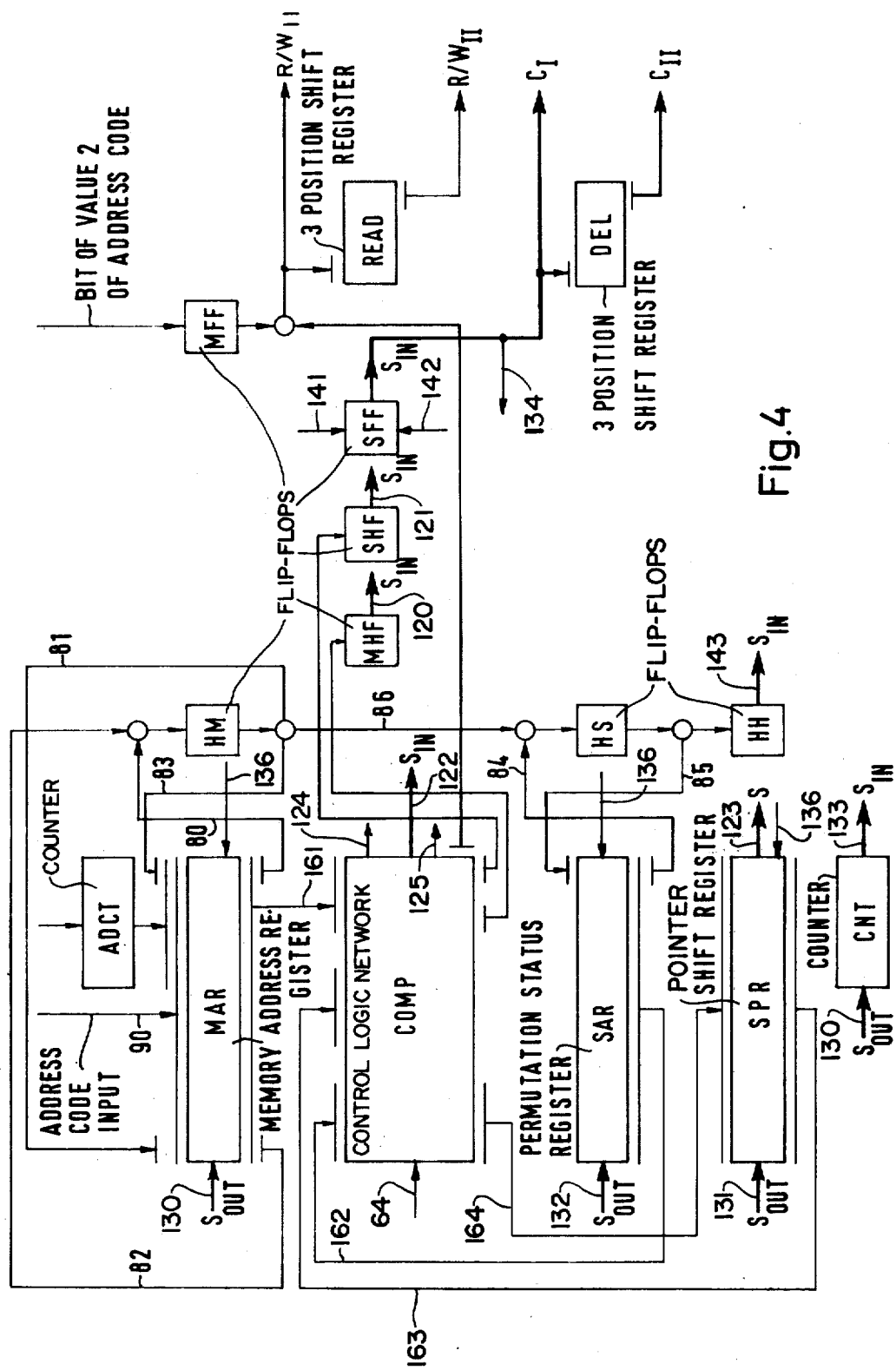
FIG. 4 is a block diagram of one embodiment of the access control system, according to the invention.

The operationally significant components of such an access control system are shown in the block diagram of FIG. 4. A permutation status register SAR represents the actual permutation state of the network in binary coded form. The desired address of the memory cell whose content is to be transported next into the read-write cells is fed to a memory address register MAR. With the support of several auxiliary registers, a logic network COMP compares the contents of registers MAR and SAR and produces from this comparison the permutation sequence required for this transport and the corresponding control signal sequence.

The distribution of the addresses over the two simultaneously operated networks directly indicates that the address bit of value 2 holds special significance in that it is not required to initiate the permutation sequence since addresses which differ only in this bit require the same permutation sequence. This bit is only required to make a selection as to which read-write cell 2 or 3 access is to be made whenever the required cell contents appear in the read-write cell of the respective network. Per definition this is, in the case of a 0, the read-write cell 2 of network I and, in the case of a 1, the read-write cell 3 of network II. The address bit with the value 2 is therefore not fed into register MAR but into a one-position binary register MFE e.g., an RS flip-flop.

The code suitable for describing the permutation state of the network is derived from the fact that due to the above-discussed limitation of the permissible permutation sequences, every cell content can reach the read-write cell within one permutation sequence. To indicate the permutation state of a network comprising $2^k-1$ cells, as shown in FIG. 2, a $k$-location register is thus sufficient which contains in binary coded from the address of that cell whose content presently is in the read-write cell. In the case of a permutation network in tandem structure as shown in FIG. 3, whose total capacity is $2(2^k-1)$ cells, a $k$-position register is also sufficient since here, as in the case of the address register, the bit of binary value 2 is irrelevant. The control problem of the network is then reduced to bringing the contents of permutation status register SAR into coincidence with the contents of memory address register MAR suitable permutations.

The algorithm required for this and its circuitwise implementation results from the relation between the binary codes of the cell addresses and the permutation sequences required for access to the cells. This connection will be explained with the aid of two examples. Access to cell 56 which is present in network I of the tandem memory of FIG. 3 is made, as can be easily seen from the structure, by means of sequence BBAABA. If as agreed upon permutation A is coded by a 1 and permutation B by a 0, the following relationship results between address code and permutation code:

| Address code    | 1  | 1  | 1 | 0 | [0] | 0 |
|-----------------|----|----|---|---|-----|---|
|                 |    | 1  | 1 | 1 |     | 1 |
| Permutation code| 00 | 11 | 0 |   |     | 1 |

The highest valued bit 1 in the address code, hereinafter also called the pilot bit, identifies the plane in which the addressed cell is disposed and thus the first permutation to be performed. In this case the cell belongs to the fourth plane and the first permutation is thus B, shown by a 0 in the permutation code. The number of bits to the right of the pilot bit, except for the framed bit of value 2 (which since it is a 0 indicates the addressed cell is in network I) provides the number of changes required, increased by 1, between the permutations A and B since every bit constitutes a plane in the tree. In the example, three changes are required, beginning with permutation B, i.e., BABA. This also shows the correspondence between the bits in the address code and those in the permutation code. If the address bit is a 1, then the associated permutation is performed twice, if the address bit is a 0, then the associated permutation is performed only once. This is also shown in the example for access to cell 39, which is in network II, with the aid of sequence BABBAA.

| Address code:     | 1 | 0 | 0  | 1 | [0] | 1  |
|-------------------|---|---|----|---|-----|----|
|                   |   | 1 | 1  | 1 |     | 1  |
| Permutation code: |   | 0 | 1  | 00|     | 11 |

Figure 5:
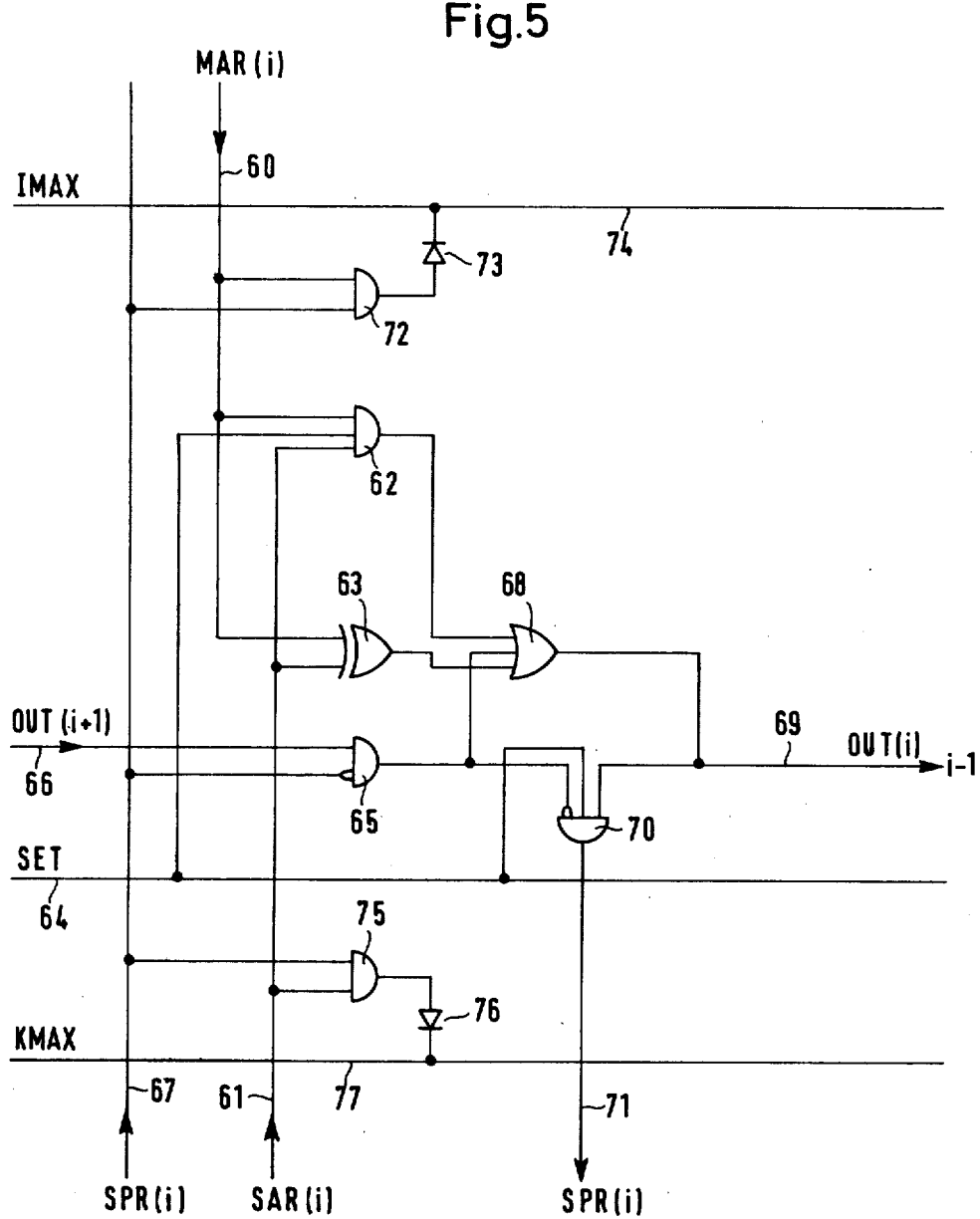
FIG. 5 is a logic circuit diagram for the comparison logic of the access control system of FIG. 4.

The pilot bit in the address code again points toward the fourth plane, i.e., the first permutation must be B. Since the first bit to the right of the pilot bit contains a 0, this permutation is performed only once. The same applies to the next-following permutation A while the successive permutations B and A each need be performed only twice. This association of the address codes with the permutations required for access to the respective cells results in the access control system shown schematically in FIG. 4, and basically includes the following components:

a memory address register MAR which is designed as a forward/backward shift register comprising $k$ binary positions corresponding to a memory capacity of $2(2^k-1)$ cells in a tandem network and to which the address code, consisting of $k+1$ bits, is fed - except for the bit of value 2 - so that the $i^{th}$ bit of the address is in the $i^{th}$ binary position of the register, the binary positions being numbered from the right toward the left in the sequence 0,2,3,4,...,$k-1,k$ (this is abbreviated as MAR ($k$:2,0));

an overflow one position binary register or flipflop HM which is connected together with register MAR to form a ring shift register so that with a shift to the right of the data in register MAR the contents of binary position MAR(0) are transferred to flipflop HM via a line 80 and the contents of flipflop HM are transferred to binary position MAR($k$) via a line 81, while conversely with a shift to the left of the data in register MAR, the overflow from binary position MAR($k$) is shifted to flipflop HM via a line 82 and its contents to binary position MAR(0) via a line 83;

a one-position binary register or flip-flop MFF into which the bit of value 2 of the address code is fed;

a permutation status register SAR($k$:2,0) which is likewise designed as a forward/backward shift register and which in each permutation state contains the binary code of the address of that cell (except for the bit of value 2) whose content happens to be at the read-write cell 2 of network I;

an overflow one-position binary register or flip-flop HS which upon a shift to the right of the data in permutation status register SAR takes over the contents of binary position SAR(0) via line 84 while its own content is lost, and which upon a shift to the left of the data in register SAR transfers its contents to binary position SAR(0) via line 85 while itself taking over the content of overflow flipflop HM via line 86;

a pointer register (forward/backward shift register) SPR(k:2,0) which contains a pointer in that always only one binary position SPR(i) has the binary value 1 while all other binary locations have the binary value 0;

a one-position binary register or flip-flop SFF which indicates the type of the last performed permutation so that SFF=1 corresponds to permutation A and SFF=0 corresponds to permutation B;

a one-position binary register or flip-flop MHF in which is recorded whether the position of the pilot bit directly after writing of a new address code in memory register MAR corresponds to a first permutation A (MHF=1) or a first permutation B (MHF=0) to be performed for access to the respective cell;

a flip-flop or one-binary control register HH in which the contents of register HS can be duplicated if required;

a one-position binary register or flip-flop SHF in which the first permutation of the permutation sequence contained in register SAR is recorded;

an m-position binary counter CNT(m- 1:0) in which the number of shifts to the right and shifts to the left performed by register MAR are counted;

a g-position binary counter ADCT (g-1:0) which is used for the consecutive addressing of cells of one page so that the counter state - beginning with the value 0 - is counted upward in steps of 1 until the value 0 has been reached again and after each counting up the contents of this counter are transferred to the last g binary positions of memory address register MAR;

a shift register DEL(0:2) comprising three binary positions into whose bit DEL(0) a 1 is entered from the one bit register SFF if permutation A is performed and a 0 is entered if permutation B is performed, whose contents are shifted to the right by one binary position with each permutation and from whose bit DEL(2) the control signals for network II can be derived after exactly two permutation clock times;

a shift register READ (0:2) which is also shifted to the right with each permutation and into whose bit position READ (0) a 1 is written if flipflop MFF is set at 1 and if simultaneously the contents of registers MAR and SAR have been brought to coincide, and whose bit position READ (2) controls the read-write cell of network II if the cell contains a 1;

a first logic network COMP which evaluates the contents of registers MAR, SAR and SPR and produces various control signals;

and a second logic control network specifically shown in FIG. 5 which controls the register shifting as well as the permutations within the memory network. The exchange of data with the first control network is shown in the block circuit diagram of FIG. 4 by arrows $S_{in}$ and $S_{out}$. It receives various control signals from the network COMP, the settings of the one bit or positions registers MHF, SHF, HH, SFF, a signal from the pointer register SPR which indicates whether the pointer coincides with the 0 bit position, and a signal from the counter CNT which indicates counter contents different from zero. From these input signals, the logic control network generates the signals for left/right shifts of the registers MAR, SAR, SPR, for counting up and down the counter CNT, and a signal which sets the one bit register SFF, from which the permutation signal $C_I$ for the memory network I and the input signal for the delay line DEL of memory network II is taken.

The operation of the first control network of FIG. 4 is as follows:

The actual permutation state of the memory network of FIG. 3 is given by the contents of the permutation status register SAR which provide the address of the cell content presently in the read-write cell 2 of network I as well as by the content of the one position register SHF which indicates the first permutation of the permutation sequence required to reach this state. Furthermore, the last performed permutation is stored in register SFF. When a new address is fed into memory address register MAR via line 90, the procedure described below is used to bring the content of this cell into the reading head of the respective memory network. With the aid of logic network COMP the pointer in SPR is first set to that binary position which corresponds to the higher valued one of the two pilot bits in registers MAR and SAR. At the same time a signal IMAX in the logic network COMP determines whether the pointer position coincides with the pilot bit in MAR and a signal KMAX in the logic network COMP determines whether the pointers position coincides with the pilot bit in register SAR. If IMAX = 1 and KMAX = 0, the higher valued pilot bit belongs to register MAR. It is now determined, with the aid of the pointer position in register SPR whether this pilot bit is at a position with corresponds to a permutation A or to a permutation B and this is recorded by the corresponding setting of register MHF. Then the indicator in register SPR is moved in steps to the right simultaneously with the contents of register MAR that are circulated in the manner mentioned above, respectively, until IMAX = 1 as well as KMAX = 1. Now the pilot bits in registers MAR and SAR are in the same position.

If however, in the starting state IMAX 32 0 and KMAX = 1, the content of register SAR is initially shifted in steps to the right together with the content of register SPR. With each step the bit transferred to one-position overflow register HS is evaluated as follows: since a logic 1 indicates that the permutation given in register SFF was performed twice, the same permutation must be performed exactly once more to compensate it in order to verify the shift to the right of rigister SAR by the corresponding shortening of the permutation sequence. if, however, HS containes a logic 0 which means that the respective permutation in SFF was performed only once, this one permutation is compensated in that the same is performed exactly twice more. This is done with the aid of the one-position binary register HH into which the contents of register HS are duplicated and where it is interpreted. If register HH contains a logic 1, the permutation is interrupted after its one-time performance. If, however, register HH contains a logic 0, register HH is set to logic 1 after the performance of a first permutation and the same permutation is performed once more. After the permutation identified by register SFF has been supplemented to three and thus the effective permutation sequence has been correspondingly shortened, the contents of register SFF a inverted. Now register SFF contains the permutation which corresponds with the bit transferred into register HS by the next shift to the right of permutation status register SAR. This shift to the right is initially repeated in steps until IMAX = 1 as well as KMAX = 1. At the moment when IMAX takes on the logic value 1, register MHF is set since the pointer position set in pointer register SPR now also coincides with the pilot bit in memory address register MAR. If the pilot bits already coincide in the starting position, the separate shifting of register MAR and SAR is not required.

Now registers MAR and SAR are shifted to the right together with the indicator in register SPR which now points to the pilot bits in both registers. As before, the bits exiting register MAR from the right are now re-entered into register MAR from the left while the bits exiting from register SAR toward the right are lost after having been interpreted in registers, HS and HH, as already described.

If the contents of the one-position registers MHF and SHF, which indicate the first permutation of the permutation sequence required for the address stored in register MAR or the first permutation sequence required to realize the actual permutation state, respectively, are identical, parts of the two permutation sequences may be identical under certain circumstances. The network COMP therefore compares the contents of register SAR and MAR after each shift to the right between the indicator position and binary position 0. If the contents are not identical a further shift to the right is performed; if they are identical, shifting to the right is terminated.

In the case where the contents of MHF registers and SHF are not identical, no identical partial sequences exist and the shift to the right of registers MAR, SAR and SPR must be repeated until the pointer position, and thus the respective pilot bits, have reached binary position 0. In this way the network is reset to its starting state.

With each shift to the right in which register MAR participates, binary counter CNT is simultaneously counted up by one so that at the end of the shifting to the right CNT contains that number of shifts to the lift which must be performed with respect to MAR to reinstate the starting situation.

When register MHF is equal to register SHF the content of register SFF remains intact upon completion of the shift to the right, while when register MHF is unequal to register SHF, the content of register MHF is transferred to register SFF.

Now registers MAR, SAR and SPR are all shifted to the left together in steps. With each step the bit appearing in the overflow register HM for register MAR is simultaneously also transferred to registers HS and HH. A logic 1 in register HH is converted into a double performance of the permutation indicated in register SFF and a logic 0 in register HH is converted to a single performance of the permutation. Upon completion of this action, the content of register SFF is inverted, counter CNT is counted down by one and the registers are shifted to the left. The procedure is stopped when the content of counter CNT has counted down to 0, i.e. the cell address fed into MAR has reattained its original position. Since the bit contained in register HM was duplicated in register HS with every step and the corresponding permutations were performed, when CNT = 0 the contents of registers MAR and SAR are identical and the cell content identified by the address contained in register MAR appears in the read-write cell of the network I. If a cell content of network II is addressed, which is given by the status of the one-position binary register MFF, a logic 1 is fed into the delay register READ when CNT has been reset to 0 to permit access to the reading head of network II after two further permutation cycles.

This procedure realizes a minimum permutation sequence for access to two arbitrary, consecutively addressed cell contents corresponding to the example for access to cells 22 and 26 of the network shown in FIG. 2.

Since the cells of the network of FIG. 3 are numbered so that access to $2^g$ consecutively numbered cells is minimal once all cell contents have been transported to planes $g$-1 of the tandem network, this access sequence can be produced in the given access system in that the $g$-position binary counter ADCT is counted up by 1, beginning with counter position 0, until the counter state 0 has been reached again. The respective counter position is transferred to the last $g$ binary positions of register MAR, whereupon the required permutation sequence for the shortest possible transport of the contents of the addressed cell into the read-write cell is effected. Particular measures for addressing the cells of network II are not required if the control bit in register MFF continues to remain at logic 1 during this process.

A significant component of the access control system is logic network COMP which correlates the contents of registers MAR, SAR and SPR with one another. Corresponding to the $k$-1 binary positions of these registers, the network contains $k$1 cells which are connected together in cascade so that logic signals are propagated from the left to the right, i.e., from the higher-valued to the lower-valued binary positions. Such a cell which corresponds to binary position $i$ is shown in FIG. 5.

Immediately after charging of register MAR with a new address, logic network COMP sets the pointer position in SPR so that it coincides with the higher-valued one of the two pilot bits in register MAR and SAR. Moreover, this network produces a signal IMAX which indicates coincidence of the pointer position in register SPR with the pilot bit in register MAR and a signal KMAX which indicates coincidence of the position in SPR with the pilot bit in SAR. Additionally, this circuit determines the identity of the contents of register MAR and SAR between the indicator position and binary position 0.

For this purpose the contents of binary position MAR($i$) are fed through a line 60 (which is one of $n$ lines of a bus 161 of FIG. 4) and the contents of binary position SAR($i$) through a line 61 (which is one of $n$ lines of a bus 163 of FIG. 4) to respective inputs of AND gate 62 and EXCLUSIVE-OR gate 63. At the same time, a control line 64 which is common to all cells and carries a signal SET is connected to a third input of AND gate 62. A further AND gate 65 receives via line 66 a signal OUT($i$+1) from the neighboring cell $i$+1 to the left and at the same time via line 67 (which is one of $n$ lines of a bus 162 of FIG. 4) the inverted contents of binary position SPR($i$) of the pointer register SPR. The outputs of gates 62, 63, 65 are connected to the inputs of an OR gate 68 whose output line 69 transmits a signal, which corresponds to the signal OUT($i$+1) received through line 66 from the left-hand cell $i$+1, to the adjacent cell $i$–1 to the right. At the same time line 69 is connected to a first input of AND gate 70 whose second and third inputs are connected to the control line 64 as well as, in inverted form, the output of AND gate 65. The output line 71 of gate 70 is connected to the input of binary position SPR($i$) of the indicator register SPR and is part of the bus 164 of FIG 4. The signal present at output line 69 is formed by the logic interconnection OUT($i$) = MAR($i$) SAR($i$) + MAR($i$) SAR($i$) SET+OUT($i$+1) SPR($i$)) (1) The signal formed at output line 71 is produced by the logic interconnection $$\overline{SPR(i)} = \overline{OUT(i+1)} \; OUT \; (i) \; SET \quad (2)$$

This part of the network can be used to set the initial pointer position as follows:

Before setting register SPR, SPR(i) = 0 applies for all positions, i.e., $\overline{SPR(i)}$ = 1. When the pointer position is set, signal SET is set to logic 1 so that, according to equation (1), the signal OUT(i) = MAR(i) + SAR(i) + OUT(i+1) is present on line 69. Per definition, the pointer must be set exactly to binary position i for which OUT(i+1) = 0 but OUT(i) = 1, i.e., register MAR as well as register SAR contain only logic 0 to the left of i, but MAR(i) = 1. This state is determined by AND gate 70 at whose output, according to equation (2) signal SPR(i) = $\overline{OUT(i+1)}$ OUT(i) is present under the condition that SET = 1, which signal can have the logic value 1 for only exactly one binary position. The entire signal pattern SPR(i) is inserted into pointer register SPR and thus the pointer position is fixed.

Now SPR ≠ 0. When SET = 0 is applied to line 64, output 69 of each cell, according to equation (1) carries the signal OUT(i) = (MAR(i) ⊕ SAR(i) + OUT-(i+1) $\overline{SPR(i)}$) Consequently, a signal 0 will appear at the output of cell 0 only when MAR(i) SAR(i) = 0 for all binary positions i between the actual pointer position SPR(i)=1 and position 0, i.e., when the cell contents of the two register segments MAR(i:2,0) and SAR(i 2,0) are identical.

AND gate 72 interconnects lines 67 and 60, i.e., pointers position SPR(i) and the contents of binary position MAR(i), so that a logic 1 will be present at the output of AND gate 72 whenever MAR(i)=1 as well as SPR(i)=1, the latter being the case, per definition, for exactly one binary position. This signal is permanently wired via a protective diode 73 to all the corresponding gate outputs of all other cells to produce the OR function $$IMAX = \Sigma \; MAR(i) \; SPR(i) \quad (3)$$

in collecting line 74.

The same function is realized with the aid of AND gate 75 and protective diode 76 on collecting line 77 for the contents of register SAR and SPR as follows:

$$KMAX = \Sigma \; SAR(i) \; SPR(i) \quad (4)$$

Since the contents of register MAR and STAR as agreed upon are shifted in synchronism with the pointer, position in SPR as soon as the pointers, coming from the left, arrives at the pilot bits of registers MAR or SAR, respectively, IMAX = 0 only as long as the pointers is still to the left of the pilot bit in MAR, in the other case IMAX = 1.

Per definition, the conditions for controlling the shifts in registers MAR and STAR are thus determined.

In order to determine whether the position of the pilot bit in register MAR requires a first permutation A or a first permutation B, the even numbered binary positions of the pointer register SPR are permantently wired, via protective diodes, to a further collecting line SMF not shown in FIG. 4 to form an OR function so that a logic 1 signal is always present when the pointer coincides with an even numbered position and a logic 0 signal when the pointers, is at an odd numbered position. At the moment when the pointer, coming from the left, arrives at the pilot bit in register MAR, i.e., when IMAX switches from 0 to 1, the signal on SMF, which indicates the pointer position, is transferred to the one-position register MHF. The operation of the first control network of FIG. 4 is supported by a second control network shown in FIG. 6 which generates from various control signals received from the first control network and an internal clock pulse generator the pulses sequences for left and right shifts of the registers MAR, SAR, SPR and for the counter CNT, and a signal for the setting of the one bit register SFF which determines the type of permutation to be executed in the memory. A first combinatorial logic network 101 receives at its four input lines 120, 121, 122, 123 the settings of the one bit or position binary registers MHF and SHF, the signals OUT(0) from the network COMP and the pointer position SPR(0), respectively, to complete at its output line 124 the logical function ID = (MHF ⊕ SHF) OUT+(MHF ⊕ SHF) SPR(0) which is responsible for right shifts if ID = 0, and for left shifts if ID = 1. The signal ID is, together with the signals IMAX on line 125 and KMAX on line 126 furnished to a second combinatorial logic network, 102 which computes the conditions for a right shift of register MAR as RMAR = IMAX $\overline{ID}$ on line 127, a right shift of register SAR as RSAR = KMAX $\overline{ID}$ on line 129 and for a right shift of register SPR as RSPR = $\overline{ID}$ on line 128. The signals RMAR, RSAR, RSPR are at the AND gates 103, 104, 105, respectively, superimposed with a clock pulse sequence P which is supplied via a line 138. The output 130 of gate 103 drives register MAR, the output 131 of gate 104 drives register SPR, the output 132 of gate 105 drives register SAR on right shifts. The AND gate 109 computes the signal SHL = CNT ID which provides the condition for a common left shift of the registers MAR, SPR, SAR. The output of gate 109 is clocked with the pulse sequence P at the AND gate 108, whose output 136 drives register MAR, SPR, SAR on left shifts. Simultaneously, the pulses sequence of the output 130 is furnished to the 'countup' input of the counter CNT to count the right shifts of the register MAR, and the pulse sequence of the output 136 is furnished to the 'countdown' input of the counter CNT.

Figure 8:
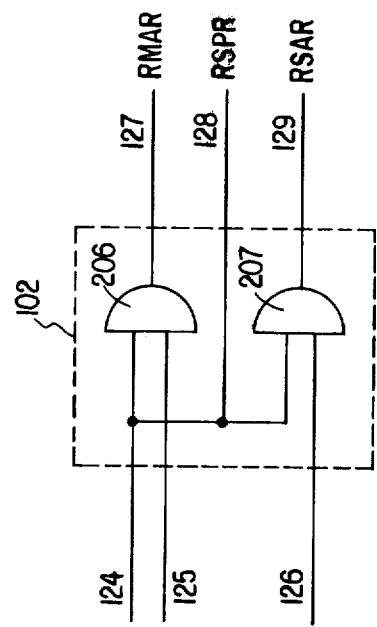
FIG. 8 is a logic circuit diagram of the network 102 of FIG. 6.
Figure 7:
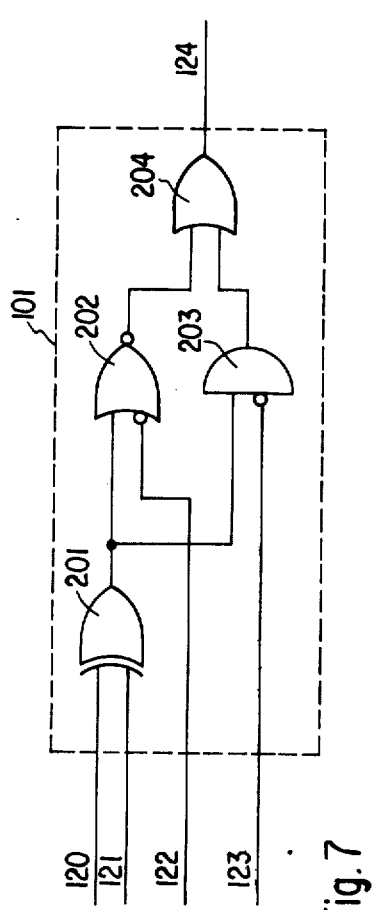
FIG. 7 is a logic circuit diagram of the network 101 of FIG. 6.

One embodiment of the contents of the logic networks 101 and 102 is shown in FIGS. 7 and 8. As shown in FIG. 7, the network 101 includes an exclusive OR gate 201, an OR gate 202 with one inverted input and an inverted output, and AND gate 203 with one inverted input, and an OR gate 204.

The exclusive OR gate 201 compares the contents of registers MHF and SHF on lines 120 to 121 respectively, to decide whether the first permutations of the sequence represented by the contents of registers MAR and SAR are identical, in which case the output of gate 201 is 0, or not indentical, in which case the output gate 201 is 1.

This signal is combined in the OR gate 202 with the signal OUT(o) on line 122 from the logic network COMP which signal is a 1 if the contents of registers MAR and STAR from the pointer position to the right differ, and is a 0 if the contents of these registers are identical. As the signal on line 122 is inverted at the input of gate 202, the output is 1 if MHF = SHF and as long as there is no identity according to the signal on line 122. The output of the AND gate 203 is 1 if MHF ≠ SHF and as long as the signal SPR(0) supplied by line 123 is 0. Hence, the output 124 of logic network 101 carries a signal 1 as long as one or all of the registers MAR, SAR, SPR must be shifted right. This output signal on line 124 is received by the logic network 102 which as shown in FIG. 8 includes two AND gates 206 and 207. In the AND gate 206 the signal RMAR supplied to line 127 is formed from the signal on line 124 and the IMAX signal on 125. The signal RSPR supplied to output line 128 of logic network 102 is identical with the signal on line 124. The signal RSAR on output line 129 is formed in the AND gate 207 from the signal on line 124 and the KMAX signal on line 126. As shown in FIG. 6, these signals on lines 127-129 are clocked in gates 103, 104, 105, respectively with the clock signal P generated with the help of gate 110 to form the output signals on lines 130, 131, 132, respectively.

Returning now to FIGS. 4 and 6 the setting of the permutation register SFF is furnished, via-line 134 to the AND gate 112 and, in inverted form, to the AND gate 111. The output 141 of gate 111 carries a set signal for register SFF if SFF=0, and the output 142 of gate 112 carries a reset signal for register SFF if SFF=1, upon the occurrence of a clock pulse P. The clock pulse sequence P is derived from the output 140 of the clock pulse generator T' with the help of the combinatorial logic networks 106, 107, the AND gate 110 and the two-digit binary counter CT. The network 106 serves to set up in the current CT the number of permutations to be performed without changing the contents of register SFF. This number is derived from the setting of the one bit or position binary register HH, and from the signals RSAR and SHL, which are furnished to the network 106 via the input lines 143, 129, 135, respectively. The bits CT(0) and CT(1) for counter CT are set as follows by the network 106:

$$CT(0) = (RSAR\ HH + SHL\ \overline{HH})\ P$$
$$CT(1) = (RSAR\ \overline{HH} + SHL\ HH)\ P$$

The counter CT is counted down with the clock sequence T on line 140. The network 107 checks the counter CT for the contents 0 and, if so, furnishes via the output 139 a 1 to the AND gate 110 to compute the pulse sequence $P = \overline{CT}\ T$. The clock pulse sequence T drives, via the line 140, the shift registers DEL and READ, and, most importantly, the memory permutations.

Figure 9:
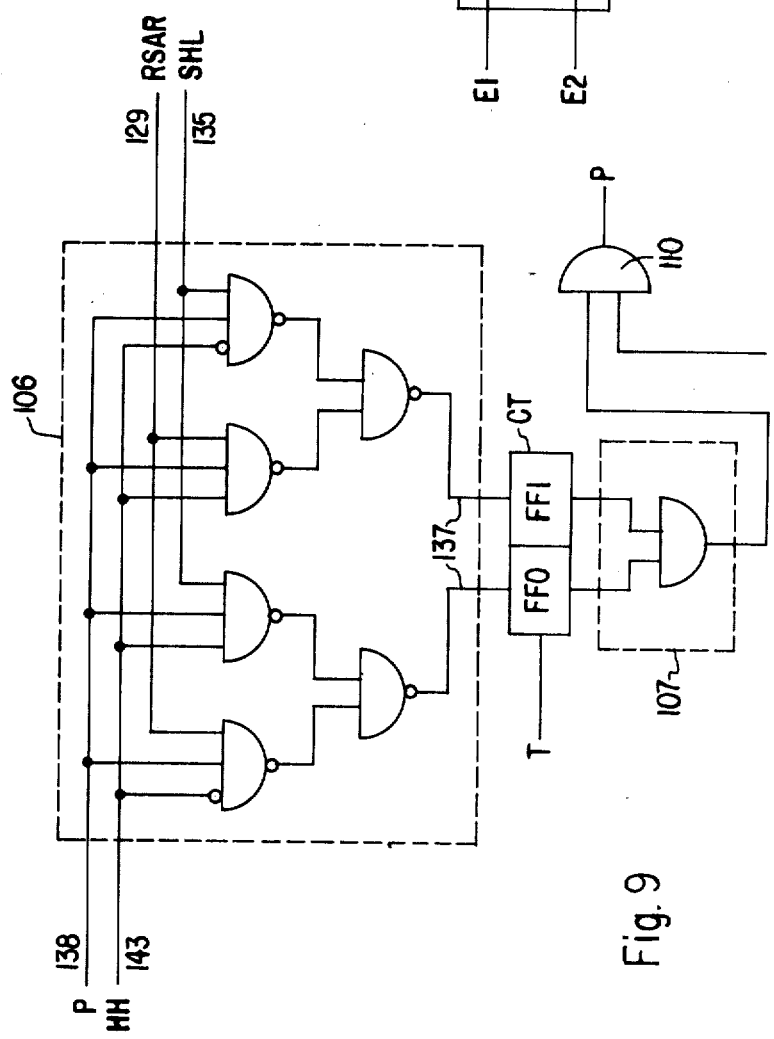
FIG. 9 is a logic circuit diagram of the networks 106, 107 of FIG. 6.

FIG. 9 shows one embodiment of the circuitry for the logic networks 106, 107 and the two digit binary counter CT which controls the generation of the clock pulse P. As shown the network 106 includes a plurality of AND gates which are connected to the input lines 129, 135, 138 and 143 and to each other to form the bits CT(0) and CT(1) for the two positions 0 and 1 of the counter CT. Whenever a right shift of SAR takes place, then on inputs 129 and 135 respectively RSAR = 1 and $SHL = 0$. The network 106, then transforms the setting of register HH on input 143 so that the counter register stage 0, which is realized by flip-flop FF0, is set to 1 and counter register stage 1, i.e., flip-flop FF1, is set to 0 if $HH = 0$, and so that stage FF0 is set to 0 and stage FF1 is set to 1 if $HH = 1$. Whenever a left shift of SAR takes place, then RSAR = 0 and SHL = 1. and SHL = 1. Then, the network 106 transforms the setting of register HH as follows: stage FF0 is set to 1 and stage FF1 is set to 0 if $HH = 1$, and stages FF0 is set to 0 and stage FF1 is set to 1 if $HH = 0$. The contents of the register CT are incremented on every clock pulse T generated in the clock pulse of the counter register CT for the appearance of a setting $FF0 = 1$ and $FF1 = 1$, and then allows the clock pulse T to pass through gate 110 to form the signal P.

Another variation of the permutation network consists in that in the tandem network of FIG. 3, the control of the second network II is modified so that the permutations B and A are interchanged with respect to the planes of this network. Thus when both networks are operated in synchronism the first network I will always introduce a new cell content into the read-write cell 2 when permutation A is performed while the second network II changes the read-write cell contents whenever permutation B is performed. The performance of the algorithm described for the "paging" process in such a tandem network then has the result that with the appropriate numbering of the cells, data structures arranged in the pattern of a tree and stored in a suitable manner can be traversed according to the so-called "pre-order" or "end-order" principle.

It a further conceivable to connect a peripheral processor ahead of such a dynamic background memory with rapid direct access to data with any desired address as well as rapid sequential access to data blocks stored in $2^q$ successively addressable cells. Such a peripheral processor relieves the central unit of part of its workload in that if performs various activities, such as processing of lists and similar administrative functions, for example, directly by means of the background memory. Furthermore, such a processor should be able to take on the function of a channel if data transport between the background memory and the operating memory of the central unit should become necessary.

It will be understood that the above description of the present invention is susceptible to various modifications, changes and adaptations, and the same are intended to be comprehended within the meaning and range of equivalents of the appended claims.

What is claimed is:

1. In a circuit arrangement for noncyclic data permutations between the memory cells of a dynamic memory including a permutation network for transferring the contents of a predetermined memory cell into the read-write cell of the memory, and an access control means connected to said permutation network, for producing a permutation sequence to cause the transfer of the contents of the predetermined memory cell into said read-write cell of the memory; the improvement wherein: said permutation network is comprised of $2^k-1$ memory cells which are arranged in a tree-like structure in $k$ of 0 to $k-1$ numbered planes so that plane $i$ is formed of $2^i$ memory cells, each memory cell of plane $i$ is connected with two adjacent interconnected memory cells of plane $i+1$ so that these three associated memory cells form an interconnected triangle in which the contents of said memory cells can be cyclically interchanged in a clockwise direction, each memory cell of the plants $1 < i < k-2$ is included in two of such triangles, and the one memory cell of plane 0, which acts as the read-write cell for the memory and each of the memory cells of plane k-1 is included in but one triangle; and said access control means is connected to said permutation network for producing either a permutation A constituted by the simultaneous transfer of the contents of the memory cells disposed in even numbered planes to the associated memory cells of the next higher odd numbered planes or a permutation B constituted by the simultaneous transfer of the contents of the memory cells disposed in odd numbered planes to the associated memory cells of the next higher even numbered plane, said permutation sequence constituting a sequence of permutation A and permutation B.

2. A circuit arrangement as defined in claim 1 wherein said access control means includes: a permutation status register (SAR) for identifying the actual permutation stage of a first memory cell with the aid of the binary code of the cell address whose contents is present in said read-write cell; a memory address register (MAR) for receiving the binary code of the cell address of a second memory cell whose contents is to be read or written next; and a logic interconnection network means connected in series with said registers (MAR) and (SAR), for producing the shortest permutation sequence required to transfer the cell contents of said second memory cell into the read-write cell.

3. A circuit arrangement as defined in claim 1 wherein each of said memory cells includes: a first and a second data input for taking over a datum and a first and second data output for discharging a datum stored in the memory cell; a control input for opening said first data input and said first data output upon receipt of a binary 1 siganl or for opening said second data input and said second data output upon receipt of a binary 0 signal; and a device for receiving the synchronization pulses effecting the data transfer; and wherein said memory cells of planes 0 and $k-1$ each have their first data output connected to the first data input or the second data output connected to the second data input of the same memory cell.

4. A circuit arrangement as defined in claim 2 wherein: said memory includes a further one of said permutation networks so that said memory has a capacity of $2(2^k-1)$ cells which are uniformly distributed over the two tree-like permutation networks, a first of said networks containing all cell addresses in whose binary code the bit with the value 2 is a 0 and the second of said networks containing all cell addresses in whose binary code the bit with the value 2 is a 1; and wherein said access control means includes a selector circuit means for automatically establishing a connection to the desired one of the read-write cells of the respective said permutation networks.

5. A circuit arrangement as defined in claim 4 wherein: said memory address register (MAR) is a forward/backward shift register with $k$ binary positions for receiving a memory cell address code consisting of $k+1$ bits except for the bit with the value 2, and said permutation status register (SAR) is a forward/backward shift register having $k$ binary positions which in every permutation state contains the binary code of the address of that memory cell — except for the bit with the value 2 — whose content is present in the read-write cell of said first permutation network; and wherein said access control means further includes:

a one-position overflow register (HM) which is connected together with said memory address register (MAR) to form a ring shift register;

a one-position register (MFF) for receiving the bits with the value 2 of the memory cell address fed to register (MAR);

a one-position overflow register (HS) connected to said register (SAR) and said register (HM) for erasing its present content and for receiving the bit of the bit position of value 0 in said permutation status register, (SAR) when said register (SAR) shifts toward said bit position of value 0, transferring its contents to the bit position with the value 0 in said register (SAR) and receiving the contents of said overflow register (HM) when said permutation status register (SAR) shifts away from said bit position of value 0;

a forward/backward shift register (SPR) with $k$ binary positions which produces a pointer of the type wherein only one binary position carries the binary value 1 and all other binary positions will carry the binary value 0;

a one-position register (SFF) for identifying the last performed permutation by providing a 1 for a permutation A or a 0 for a permutation B;

a logic network (COMP) for evaluating the contents of said memory address register (MAR), said permutation status register (SAR) and said register (SPR) and for producing control signals;

a one-position register (MHF) controlled by said network (COMP) for identifying the first permutation of the permutation sequence required to access the address contained in said register (MAR) by providing a binary value 1 for a permutation A and a binary value 0 for a permutation B;

a one-position register (SHF) controlled by said network (COMP) for indicating the first permutation of the permutation sequence contained in said permutation status register (SAR) by providing a binary value 1 for a permutation A and a binary value 0 for a permutation B;

a one-position control register ($HH$) for duplicating the contents of said overflow register (HS);

an $m$-position counter register (CNT) for counting the shifts performed by said memory address register (MAR), said register (CNT) counting up for shifts in one direction and counting down shifts in the opposite direction;

a shift register (DEL) having three binary positions whose contents are shifted with every permutation, its first binary position marking a permutation A with a binary value 1 and a permutation B with a binary value 0 and its third binary position emitting a control signal for the permutations in said second permutation network after two permutations clock times;

a shift register (READ) having the three binary positions whose contents are shifted with every permutation and whose input binary position is connected to said network (COMP) and the ouput of said register (MFF) and is set to 1 when said register (MFF) contains a 1 and said network (COMP) produces a control signal indicating that the contents of memory address register (MAR) and permutation status register (SAR) coincide, the output binary position of said register (READ) being connected to said read-write cell of said second permutation network for enabling same when a binary value 1 appears in said output position; and an internal control logic means for controlling said registers and the permutations.

6. A circuit arrangement as defined in claim 5 wherein: each binary position of said memory address register (MAR), of said permutation status register (SAR) and of said register (SPR) has an associated cell $i$ in said logic network (COMP); each said cell $i$ has four input lines with the first input line being connected with the output of the $i^{th}$ binary position of said register (MAR), the second input line being connected with the output of the $i^{th}$ binary position of said register (SAR), the third input line being connected with the outputof the $i^{th}$ binary position of said register SPR and the fourth input line being connected with the output of the $(i+1)^{th}$ cell of said network (COMP); each said cell $i$ has two outputs with the first output being connected with the corresponding fourth input of the $(i-1)^{th}$ cell of said network COMP and the second output being connected with the input of the $i^{th}$ binary position of said register (SPR); and all cells of said logic network (COMP) are connected to a first and a second signal collection line and a control line.

7. A circuit arrangement as defined in claim 6 wherein each cell of said network (COMP) further includes: a first AND gate and an EXCLUSIVE-OR gate, each having a first input connected to said first input line and a second input connected to said second input line, said first AND gate additionally having a third input connected to said control line; a second AND gate having a first input connected with said fourth input line and a second inverted input connected to said third input line; an OR gate having its inputs connected to the respective outputs of said first and second AND gate and of said EXCLUSIVE-OR gate;

a third AND gate having a first input connected to the output of said OR gate, a second inverted input connected with the output of said second AND gate; and a third input connected with said control line, the output of said third AND gate being connected to and constituting said second output of said cell $i$;

a fourth AND gate whose inputs are respectively connected to said first and third input lines and whose output is connected to said first collection line via a first protective diode; and a fifth AND gate whose inputs are respectively connected to said second and third input lines and whose output is connected to said second collection line via a second protective diode.

8. A circuit arrangement as defined in claim 7 wherein for the sequential access to $2^g$ consecutive, addressable memory cell contents whose first address must be an integer number multiple of $2^g$, a $g$-position binary counter (ADCT) is integrated into said access control means, said counter (ADCT) being connected to said memory address register (MAR) for transferring the contents of said counter after each counting step to the last $g$ binary positions of said memory address register (MAR).

* * * * *